United States Patent
Jamadagni et al.

(10) Patent No.: US 11,160,086 B2
(45) Date of Patent: Oct. 26, 2021

(54) TUNING TO AN AVAILABLE CHANNEL IN A NARROW BAND WIRELESS NETWORK

(71) Applicant: RELIANCE JIO INFOCOMM LIMITED, Maharashtra (IN)

(72) Inventors: Satish Nanjunda Swamy Jamadagni, Karnataka (IN); Sarvesha Anegundi Ganapathi, Karnataka (IN)

(73) Assignee: RELIANCE JIO INFOCOMM LIMITED, Mumbai (IN)

( * ) Notice: Subject to any disclaimer, the term of this patent is extended or adjusted under 35 U.S.C. 154(b) by 58 days.

(21) Appl. No.: 16/643,500

(22) PCT Filed: Aug. 31, 2018

(86) PCT No.: PCT/IB2018/056670
§ 371 (c)(1),
(2) Date: Feb. 28, 2020

(87) PCT Pub. No.: WO2019/043638
PCT Pub. Date: Mar. 7, 2019

(65) Prior Publication Data
US 2020/0351885 A1 Nov. 5, 2020

(30) Foreign Application Priority Data
Aug. 31, 2017 (IN) .............................. 201721030965

(51) Int. Cl.
*H04W 4/00* (2018.01)
*H04W 72/04* (2009.01)
*H04W 74/08* (2009.01)

(52) U.S. Cl.
CPC ... *H04W 72/0486* (2013.01); *H04W 74/0833* (2013.01)

(58) Field of Classification Search
None
See application file for complete search history.

(56) References Cited

U.S. PATENT DOCUMENTS 6,658,010 B1 * 12/2003 Enns .................. H04N 21/2381
370/401
2013/0229996 A1 * 9/2013 Wang ................... H04L 1/1685
370/329

(Continued)

FOREIGN PATENT DOCUMENTS

| CN | 106664265 | 5/2017 |
| WO | 2016011433 | 1/2016 |
| WO | 2016942443 | 3/2016 |

OTHER PUBLICATIONS

International Search Report in the International Application No. PCT/IB2018/056670, dated Jan. 28, 2019.

(Continued)

*Primary Examiner* — Elisabeth Benoit Magloire
(74) *Attorney, Agent, or Firm* — Ladas & Parry, LLP (57) ABSTRACT

Embodiments of the present disclosure may relate to mechanism for tuning to an available channel in a narrow band wireless network. In an embodiment, a base station [104] may transmit a channel list (comprising available channel/s) to a NB-IoT device [102] that may transmit a channel request (comprising operational mode of the NB-IoT device [102]) back to the base station [104]. The base station [102] may define a first parameter and a second parameter based on said operational mode and accordingly determine an allocation scheme. Subsequently, the base station [104] may transmit the allocation scheme indicative of the allocation of the available channels to the NB-IoT device [102] such that the NB-IoT device [102] tunes to the available channel/s. In another embodiment, the NB-IoT device [102] may itself tune to the available channel/s and may transmit a notification message to each of the available channel/s based on said tuning.

23 Claims, 8 Drawing Sheets

(56) References Cited

U.S. PATENT DOCUMENTS

| | | | | |
|---|---|---|---|---|
| 2016/0021596 A1* | 1/2016 | Hui | ...................... | H04W 40/04 |
| | | | | 370/329 |
| 2018/0054821 A1* | 2/2018 | Sun | ..................... | H04W 72/042 |
| 2018/0249382 A1* | 8/2018 | Yang | ..................... | H04W 36/22 |
| 2018/0287846 A1* | 10/2018 | Kim | .................... | H04L 27/2666 |
| 2019/0053202 A1* | 2/2019 | Bendlin | ................ | H04W 72/04 |
| 2019/0239051 A1* | 8/2019 | Hwang | ............... | H04W 56/001 |
| 2019/0335527 A1* | 10/2019 | Byun | ..................... | H04W 8/08 |
| 2021/0119750 A1* | 4/2021 | Hong | .................. | H04L 12/2818 |

OTHER PUBLICATIONS

Written Opinion of the International Searching Authority in the International Application No. PCT/IB2018/056670 dated Jan. 28, 2019.

\* cited by examiner

TUNING TO AN AVAILABLE CHANNEL IN A NARROW BAND WIRELESS NETWORK

CROSS-REFERENCE TO RELATED APPLICATIONS

This application is the U.S. national phase of International Application no. PCT/IB2018/056670 filed on Aug. 31, 2018, which claims priority to Indian Application No. 201721030965 filed on Aug. 31, 2017, the disclosures of which are incorporated by reference herein in their entireties.

TECHNICAL FIELD

The present disclosure generally relates to wireless communication networks and is more specifically, directed to system and method for tuning to an available channel in a narrow band wireless network.

BACKGROUND

The internet of things (IoT) may be referred to as a network of everyday physical devices and/or computing devices connected to the internet for connecting and exchanging data. With the advancements and increasing popularity of the IoT concept, a plurality of devices ranging from everyday objects (like coffee makers, washing machines, headphones, lamps and wearable devices) to smart devices/concepts (such as smart metering, child monitoring) have become potential IoT devices. Said IoT devices are usually provisioned with an IP address so that said devices are able to transfer data and receive control signals over an IP network according to the standard Internet protocols such as TCP/IP.

Further, Narrow Band-Internet of Things (NB-IoT) is a Low Power Wide Area Network (LPWAN) radio technology standard that is being introduced by 3GPP in release 13. This NB-IoT technology enables a wide range of cellular devices and services by significantly improving power consumption of user devices, system capacity and spectrum efficiency, especially in deep coverage. In addition, the NB-IoT technology has been implemented in licensed bands, wherein the licensed bands of LTE are used for exploiting this technology and the technology makes use of a minimum system bandwidth of 180 KHz i.e. one PRB (Physical Resource Block) being allocated for this technology. Also, said NB-IOT technology shows better performance as compared to Low Power Wide Area (LPWA).

Going further, the NB-IoT may also be considered as an individual and separate Radio Access Technology (RAT), wherein the NB-IOT may be deployed in 3 different modes i.e. in-band, guard band and "standalone". In the in-band operation, resource blocks present within LTE carrier may be used i.e. the inner resource blocks may not be used as they are allotted for synchronization of LTE signals. In guard band operation, resource blocks between LTE carriers that are not utilized by any operator may be used. In standalone operation, GSM frequencies or unused LTE bands may be used. Further, the Release 13 comprises important refinements like discontinuous reception (eDRX) and power save mode (PSM) that ensures battery longevity in release 12 and is completed by eDRX for devices which are required to receive data more frequently.

Further, the NB-IoT technology addresses some of the key IoT requirements by providing increased battery lifetime, improved network coverage, cost effective devices, enabling multiplexing of devices for meeting capacity requirements and supporting a large number of devices. Therefore, it is evident that the NB-IoT technology has become widespread and supports a wide range of applications such as meter reading of water, electricity consumption, facility management services, fire alarms for home and commercial properties, tracking of persons and objects. In light of said applications and advantages, industries in various domains/areas are making use of the NB-IoT technology, wherein the domain/area include, but not limited to, smart city, smart home, safety and security, agriculture, health care, energy and logistic tracking. In said logistic tracking, various tracking devices may be installed on shipping containers to send a large number of sensor data that is further collected and analyzed for ensuring real time tracing of shipment locations. In addition, the output display units are used for receiving alerts and optimized with service recommendations.

In a typical NB-IOT deployment, the NB-IOT cells have a 20 db gain over other categories such as CAT 4/3/1 cells and thus, the NB-IOT carrier supports larger areas over CAT 4/3/1 base station/channels. In a typical NB-IOT scenario, the same base station provides the NB-IOT channels for a device. Also, the base station (same or different) provides a channel for a CAT-1 or a CAT 3/4 operation due to the difference in the NB-IOT and other category cell coverage areas.

Considering a huge number of IoT devices being connected and a large variety of applications to parse IoT data, bandwidth has become a serious concern for downlink as well as uplink, since a limited network bandwidth may be a weak link in the chain as latency stifles progress. Also, in the IoT ecosystem development, there are various challenges with the increase in number of IoT devices, one of which is uploading and managing the data. Likewise, handling uplink capacity for uplink channels is also a major concern in the conventional IoT ecosystem. Moreover, in an event where the transmission requirement of the device is greater than the channel capacity of the existing channel, the conventional mechanism fails to support Carrier Aggregation (CA) and/or Dual Connectivity between the NB-IOT channels/cells and CAT-M1/1/3/4 cells i.e. the conventional mechanism fail to provide more number of channels based on the demand.

Accordingly, in order to overcome the aforementioned problems inherent in the existing solutions for aggregating the channels, there exists a need of an efficient mechanism for facilitating Carrier Aggregation and/or Dual Connectivity between the NB-IOT devices, NB-IOT channels/cells to provide efficient upload of the data from the IoT devices.

SUMMARY

This section is provided to introduce certain objects and aspects of the present disclosure in a simplified form that are further described below in the detailed description. This summary is not intended to identify the key features or the scope of the claimed subject matter.

Embodiments of the present disclosure may relate to a method for tuning to at least one available channel in a narrow band wireless network. The method comprising: transmitting, by at least one base station, a channel list to at least one a narrowband internet of things (NB-IoT) device, wherein the channel list comprises the at least one available channel, each of the at least one available channel has a unique channel identifier, and the at least one NB-IOT device is latched to the at least one base station via at least one existing channel; transmitting, by the at least one (NB-IoT) device, a channel request to the at least one base station, wherein the channel request comprises at least one communication parameter including an operational mode of the NB-IoT device, and the operational mode comprises one of an in-band operation, a guard band operation and a standalone operation; defining, by the at least one base station, a first parameter in event the operational mode is the in-band operation, and a second parameter in an event the operational mode is one of the guard band operation and the standalone operation, wherein the first parameter comprises an OFDM start symbol and a first control size, and the second parameter comprises a second control size; determining, by the at least one base station, an allocation scheme based on the at least one communication parameter, the unique channel identifier, and one of the first parameter and the second parameter, wherein the allocation scheme indicates the at least one available channel allocated to the at least one NB-IoT device; transmitting, by the at least one base station, the allocation scheme to the at least one NB-IoT device [102]; and tuning, by the at least one NB-IoT device, to the at least one available channel, wherein said tuning is performed pursuant to decoding of the allocation scheme.

Further, the embodiments of the present disclosure encompass a system for tuning to at least one available channel in a narrow band wireless network. The system comprising: at least one base station configured to transmit a channel list to at least one a narrowband internet of things (NB-IoT) device, wherein the channel list comprises the at least one available channel, each of the at least one available channel has a unique channel identifier, and the at least one NB-IOT device is latched to the at least one base station via at least one existing channel; the at least one (NB-IoT) device configured to transmit a channel request to the at least one base station, wherein the channel request comprises at least one communication parameter including an operational mode of the NB-IoT device, and the operational mode comprises one of an in-band operation, a guard band operation and a standalone operation; the at least one base station is further configured to: define a first parameter in event the operational mode is the in-band operation, and a second parameter in an event the operational mode is one of the guard band operation and the standalone operation, wherein the first parameter comprises an OFDM start symbol and a first control size, and the second parameter comprises a second control size; determine an allocation scheme based on the at least one communication parameter, the unique channel identifier, and one of the first parameter and the second parameter, wherein the allocation scheme indicates the at least one available channel allocated to the at least one NB-IoT device; transmit the allocation scheme to the at least one NB-IoT device; and the at least one NB-IoT device is further configured to tune to the at least one available channel, wherein said tuning is performed pursuant to decoding of the allocation scheme.

Furthermore, the embodiments of the present disclosure encompass a method for tuning to at least one available channel in a narrow band wireless network, the method being performed by at least one NB-IoT device. The method comprising: receiving a channel list from at least one base station, wherein the channel list comprises the at least one available channel, each of the at least one available channel has a unique channel identifier, and the at least one NB-IoT device is latched to at least one base station via at least one existing channel; tuning to the at least one available channel based on the unique channel identifier and at least one communication parameter of the at least one NB-IoT device; and transmitting a notification message to each of the at least one available channel based on said tuning, wherein the notification message includes information for directing to a destination server.

Moreover, the embodiments of the present disclosure encompass a NB-IoT device for tuning to at least one available channel in a narrow band wireless network. The NB-IoT device is configured to: receive a channel list from at least one base station, wherein the channel list comprises the at least one available channel, each of the at least one available channel has a unique channel identifier, and the at least one NB-IoT device is latched to at least one base station via at least one existing channel; tune to the at least one available channel based on the unique channel identifier and at least one communication parameter of the at least one NB-IoT device; and transmit a notification message to each of the at least one available channel based on said tuning, wherein the notification message includes information for directing to a destination server.

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components or circuitry commonly used to implement such components.

DETAILED DESCRIPTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address any of the problems discussed above or might address only one of the problems discussed above. Some of the problems discussed above might not be fully addressed by any of the features described herein. Example embodiments of the present disclosure are described below, as illustrated in various drawings in which like reference numerals refer to the same parts throughout the different drawings.

Embodiments of the present disclosure may relate to a system and a method for tuning to at least one available channel in a narrow band wireless network in an event a NB-IoT device needs to transmit more data as compared to the channel capacity of an existing channel between the NB-IoT device and the other device or between the NB-IoT device and the network. More particularly, the system comprises at least one NB-IoT device and a network entity, wherein the network entity comprises a mobility management entity (MME), an inter-channel coordination entity and at least one base station. The at least one NB-IoT device is latched to the at least one base station via at least one existing channel. The at least one base station transmits a channel list (comprising the at least one available channel) to the at least one NB-IoT device in response to which the at least one NB-IoT device transmits a channel request (comprising a communication parameter including an operational mode of the NB-IoT device) to the at least one base station for enabling tuning to at least one available channel in a narrow band wireless network. On receiving the channel request, the at least one base station defines a first parameter or a second parameter based on said operational mode of the at least one NB-IoT device. Thereafter, the at least one base station [104] determines an allocation scheme (indicating the at least one available channel allocated to the at least one NB-IoT device) based on various parameters and transmits the allocation scheme to the at least one NB-IoT device. Pursuant to receiving the allocation scheme, the at least one NB-IoT device tunes to the at least one available channel in a narrow band wireless network, wherein said tuning corresponds to aggregating the at least one existing channel with the at least one available channel having a 200 KHz channel width, or said tuning corresponds to switching from the at least one existing channel to the at least one available channel having a 400 KHz channel width.

In an exemplary embodiment, the present disclosure encompasses inter channel carrier aggregation or a 400 KHz operation. For example, the 400 KHz operation corresponds to either aggregating two 200 KHz channels or forming a single 400 KHz channel to meet the transmission demand of the at least one NB-IoT device, wherein said 400 Khz channel is an independent channel which is acquired by the device after reading the system information and other channel related information.

As used herein, the NB-IoT device may include, but not limited to, a mobile phone, a tablet, a phablet, a laptop, a desktop computer, a personal digital assistant (PDA), a consumer electronics device such as meter, television and any such device obvious to a person skilled in the art.

As used herein, the at least one base station (macro base station or micro base station) may comprise of multiple cellular and Wi-Fi small cells, either separate or integrated and may be deployed at various locations under a specific coverage area.

As used herein, the MME resides in the network entity and may be configured to verify information receiving from the NB-IoT device.

As used herein, the at least one available channel and the at least one existing channel may be NB-IOT channel. The NB-IOT channel may be referred to as a channel established between the NB-IOT devices and the NB-IOT base station.

Figure 1:
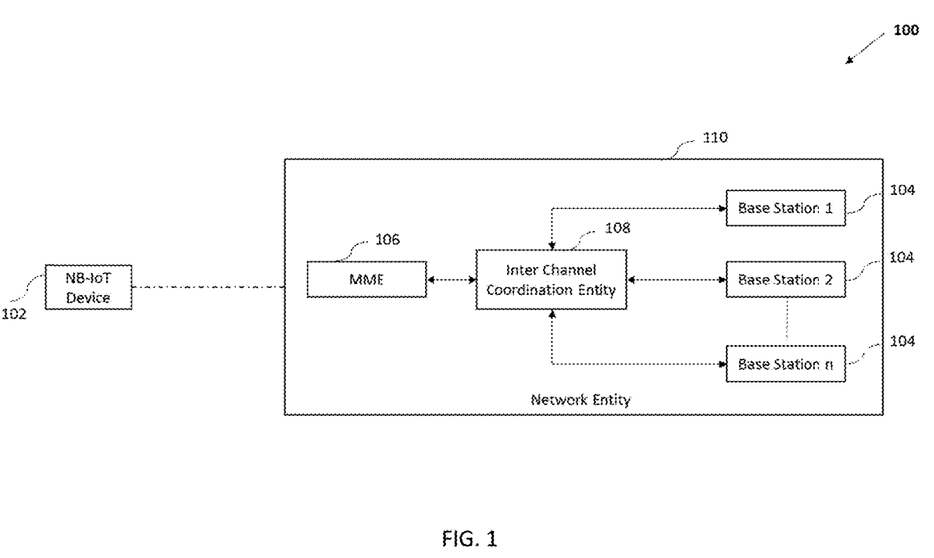
FIG. 1 illustrates an exemplary a system architecture [100] for tuning to at least one available channel in a narrow band wireless network in accordance with an embodiment of the present disclosure.
Figure 2:
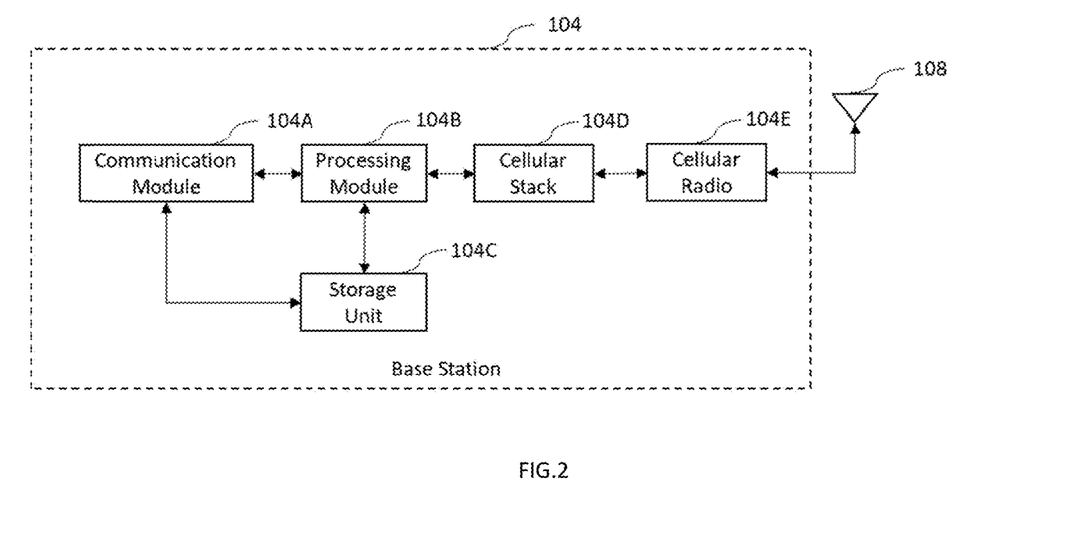
FIG. 2 illustrates an exemplary base station [104] deployed in the narrow band wireless network for tuning to at least one available channel in a narrow band wireless network in accordance with an embodiment of the present disclosure.

FIG. 1 illustrates an exemplary embodiment of the present disclosure which encompasses a system tuning to at least one available channel in a narrow band wireless network. The system [100] may comprise at least one NB-IoT device [102] and a network entity [110] comprising the MME [106], inter-channel coordination entity [108] and at least one base station [104], wherein the at least one NB-IoT device [102] may be latched to the at least one base station [104] via at least one existing channel in a network. As illustrated in FIG. 2, the at least one base station [104] may comprise of a communication module [104A], a processing module [104B], a storage unit [104C], a cellular stack [140D] and a cellular radio [140E] connected with an antenna [108]. As illustrated in FIG. 1 and FIG. 2, the communication module [104A] of the at least one base station [104], may be configured to transmit a channel list to the at least one NB-IoT device [102], wherein the channel list comprises the at least one available channel each having a unique channel identifier i.e. channels available at that moment provided said available channels are supported by the at least one NB-IoT device [102] and the at least one base station [104]. The unique channel identifier may include a frequency of the channel, a NB-IoT Cell identifier, a frequency range, a Physical Resource Block (PRB) identifier and a range of Physical Resource Block identifiers. In an embodiment, said channel list may be transmitted through a broadcast channel i.e. the channel list may be broadcasted to all the NB-IoT devices available in the coverage area of the at least one base station [104], while in another embodiment, said channel list may be implemented through a unicast channel i.e. the channel list may be transmitted to a particular NB-IoT device [102] based on a pre-configured at least one communication parameter. The channel list comprises a list of 200 Khz and 400 Khz NB-IOT Cells. In an embodiment, the channel list may be transmitted to the at least one NB-IoT device [102] through a Radio Resource Configuration (RRC) message.

Further, on receiving the channel list from the at least one base station [104] from the communication module [104A] of the at least one base station [104], the at least one NB-IoT device [102] may be configured to read and analyze the channel list and further transmit the channel request to the communication module [104A] in an event the transmission requirement of the at least one NB-IoT device [102] is more than a channel capacity of the at least one existing channel, wherein the channel request comprises at least one communication parameter. The at least one communication parameter contained in the channel request may include an operational mode of the at least one NB-IoT device [102], wherein said operational mode comprises one of an in-band operation, a guard band operation and a standalone operation. In addition, the at least one communication parameter comprises at least one of a bit indicator (indicating the need for carrier aggregation), a data status (indicating data availability to be more than what the channel can support) and a quality and a quantity of required number of channels from the channel list. Also, the channel list may be transmitted to the communication module [104A] in one of a periodic manner, an on-demand manner and an on-the-fly manner. Further, the communication module [104A] may be connected to the processing module [104B] to work with each other and receive the channel request from the communication module [104A] of the at least one base station [104].

The processing module [104B] may be configured to define one of a first parameter (for e.g. $I^N_{start}$) and a second parameter based on the operational mode at least one NB-IoT device [102]. More particularly, the processing module [104B] may be configured to define the first parameter in an event the operational mode, of the NB-IoT device, is found to be the in-band operation while the second parameter may be defined in an event the operational mode, of the NB-IoT device, is found to be one of the guard band operation and the standalone operation. The first parameter comprises an OFDM start symbol and a first control size and the second parameter comprises a second control size, wherein the first control size is signaled by a broadcast message. In an embodiment, said broadcast message may be a narrow band system information block 1 (NB-SIB 1). In an embodiment, the OFDM start symbol may be a PDCCH start indicator and the first control size may be a PDCCH space as indicated in the SIB/Broadcast message.

Thereafter, the processing module [104B] may be configured to determine an allocation scheme which is calculated and plotted based on the at least one communication parameter, the unique channel identifier, and one of the first parameter and the second parameter, wherein the allocation scheme indicates the at least one available channel allocated to the at least one NB-IoT device [102], and mechanism for communicating/transmission of data using the newly allotted channel i.e. either a newly added channel along with already existing channel or a new channel with larger channel width (e.g. 400 KHz).

The processing unit [104B] may internally communicate the allocation scheme to the communication module [104A] that may be configured to transmit the allocation scheme to the at least one NB-IoT device [102] for enabling said tuning. In an embodiment, the allocation scheme may be transmitted to the at least one NB-IoT device [102] via NPDCCH channel. Also, the processing module [104B] as used herein may include, but not limited to, processor or set of processors configured to perform operations, such as, for example, a microprocessor, a multi-core microprocessor, a digital signal processor, a collection of electronic circuits, or a combination thereof. In an exemplary embodiment, the at least one channel may be allocated in the Narrowband Physical Resource Access Channel (NPRACH) i.e. the at least one NB-IoT device [102] may be configured to transmit the data via the NPRACH.

The at least one NB-IoT device [102], may be then configured to decode the allocation scheme and subsequently tune to the at least one available channel. More particularly, said tuning may either correspond to aggregating the at least one existing channel with the at least one available channel having a 200 KHz channel width or may correspond to switching from the at least one existing channel to the at least one available channel having a 400 KHz channel width.

The inter-channel coordination entity [108] may be configured to communicate a data flow between the at least one available channel for the at least one NB-IoT device [102]. Said inter-channel coordination entity [108] further may comprise a load information for each of the at least one available channels in the in-band or the guard band NB-IOT deployment scenario. This may help in deciding the channels that will be advertised for carrier aggregation or for establishing a 400 Khz NB-IOT channel. The inter-channel coordination entity [108] is explained in detail through FIG. 3.

Pursuant to a successful connection between the at least one NB-IoT device [102] and the at least one available channel, the at least one NB-IoT device [102] may be enabled to transmit the required data to at least one of the other NB-IoT device [102] (receiver) and the network (server).

In an embodiment and for implementation point of view, for an anchor and a non-anchor channel deployment, the RRC signaling mechanism may be used to coordinate between two RRC entities in the same network, wherein the RRC reconfiguration message may be enhanced to support a carrier aggregation between a CAT 4/3/1 and a NB-IOT channel. In addition, the at least one channel in at least one NB-IoT device [102] (in RRC signaling communication) may be configured to a non-anchor carrier for all unicast communications. The at least one NB-IoT device [102] may use a non-anchor carrier for broadcast communication; however, in case the non-anchor carrier is not configured with the at least one NB-IoT device [102], the communications may occur on the anchor carrier. There may be various anchor and non-anchor carrier combinations that may be valid for such communications and some of which are as follows:

| | | Anchor Carrier | | |
|---|---|---|---|---|
| | | In-band | Guard-band | Standalone |
| Non-Anchor Carrier | In-band | Valid (Note 1) | Valid (Note 1) | Invalid |
| | Guard-band | Valid (Note 1) | Valid (Note 1) | Invalid |
| | Standalone | Invalid | Invalid | Valid (Note 2) | wherein, Note 1 refers to an event where both carriers/channels are associated with the same LTE cell; and Note refers to an event where total frequency span does not exceed 20 MHz and both anchor and non-anchor carriers are synchronized.

The cellular radio [104D] may be connected to the antenna [108] for receiving and transmitting communication signals and data, wherein the cellular radio [104D] may be selected from a wide range of frequency bands such as 800 MHz, 900 MHz, 1800 MHz, 2100 MHz, 2300 MHz, etc. The cellular radio [104D] may be then configured to work with the cellular stack [206].

The storage unit [104C] may be configured to store and maintain the channel list, the at least one communication parameter, the allocation scheme and other related information as may be obvious to person skilled in the art. The storage unit [104C] may include, but not limited to, a volatile memory, non-volatile memory, a remote storage, a cloud storage, high-speed random access memory and/or non-volatile memory, such as one or more magnetic disk storage devices, one or more optical storage devices, and/or flash memory (e.g., NAND, NOR) or a combination thereof.

Figure 3:
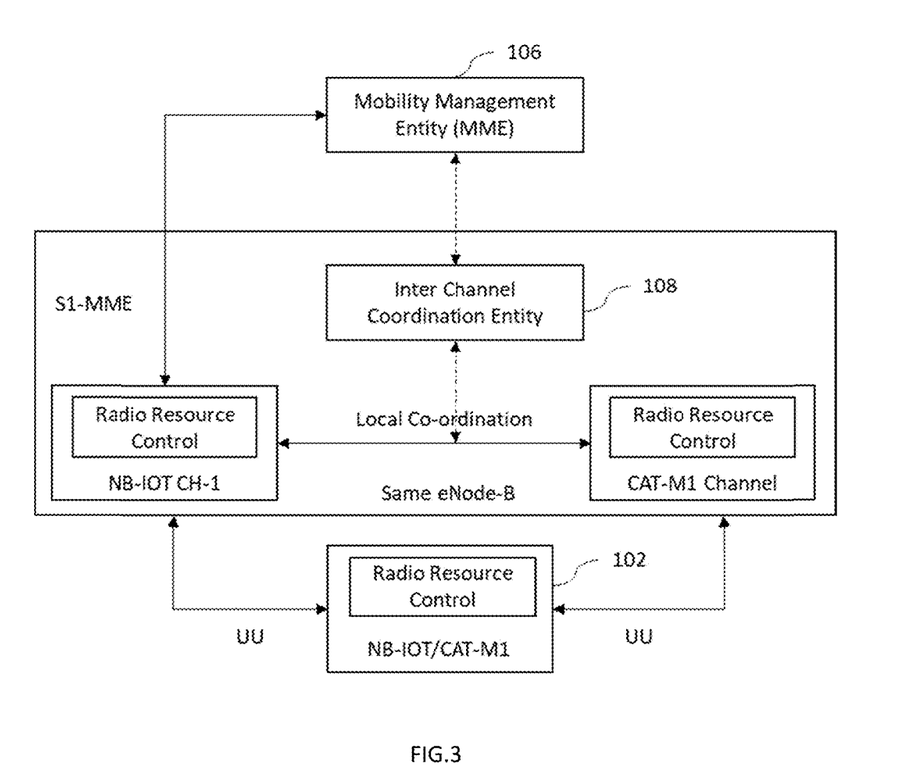
FIG. 3 illustrates the exemplary block diagram of an inter-channel coordination entity [108], in accordance with an embodiment of the present disclosure.

FIG. 3 illustrates the exemplary block diagram of the inter-channel coordination entity [108], in accordance with an embodiment of the present disclosure. The inter-channel coordination entity [108] may be configured to communicate the data flow between the at least one available channel for the at least one NB-IoT device/CAT-M1 [102]. Also, the inter channel coordination entity [108] may be configured to establish a local coordination i.e. inter RRC communication channels between the channels (RRC). Moreover, the inter channel coordination entity [108] resides at the network end i.e. the network entity [110].

Figure 4:
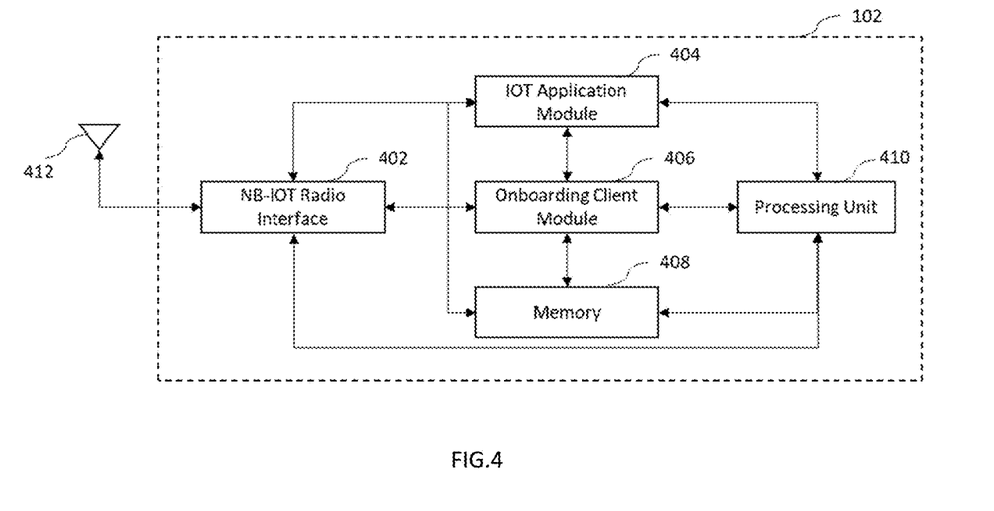
FIG. 4 illustrates an exemplary NB-IoT device [102] deployed in the narrow band wireless network for tuning to at least one available channel in a narrow band wireless network in accordance with an embodiment of the present disclosure.

FIG. 4 illustrates an exemplary NB-IoT device [102] deployed in the narrow band wireless network for tuning to at least one available channel in a narrow band wireless network in accordance with an embodiment of the present disclosure. The at least one NB-IoT device [102] may comprise an NB-IOT Radio Interface [402] connected with an antenna [412], an IOT application module [404], an on-boarding client module [406], a memory [408] and a processing unit [410]. The IOT application module [404] may be configured to implement IOT functionality in combination with multiple hardware and software components and further communicate over the desired IP network via the NB-IOT Radio Interface [402]. The on-boarding client module [406] may be configured to communicate to an on-boarding server via the NB-IOT Radio Interface [402] while being in charge of device specific on-boarding function.

More particularly and as illustrated in said FIG. 4, the IOT application module [404], of the at least one NB-IoT device [102], may be configured to receive the channel list from the at least one base station [104], wherein the channel list comprises the at least one available channel and each of the at least one available channel has a unique channel identifier. Further, the processing unit [410] may be configured to tune to the at least one available channel based on the unique channel identifier and the at least one communication parameter of the at least one NB-IoT device [102]. Subsequently the on-boarding client module [406] may be configured to transmit a notification message to each of the at least one available channel based on said tuning, wherein the notification message includes information for directing to a destination server. In an embodiment, the at least one NB-IoT device [102] may be configured to measure a channel quality and type of the at least one available channel; and subsequently compare the measured channel quality and the type with a pre-defined channel value. Based on said comparison, the at least one NB-IoT device [102] may tune to the at least one available channel. Finally, the at least one NB-IoT device [102] may be configured to transmit a data to the destination server through the at least one tuned channel. Further, the IOT application module [404] and the on-boarding client module [406] may be configured to interact with the memory [408] for storing the channel list, the channel request and any such information as may be obvious to person skilled in the art. Further, the NB-IOT Radio Interface [402] connected with the antenna [412], the IOT application module [404], the on-boarding client module [406] and the memory [408] may be configured to communicate with the processing unit [410] for execute the desired functions.

In an exemplary embodiment of comparing the measured channel quality and the type with the pre-defined channel value of a cell, the pre-defined value may be defined by the System Information Blocks—Narrow Band (SIB-NB) in accordance to a Selection Criteria (S-criteria), wherein said S-criteria defines various scenarios. In one scenario, if both values are above said pre-defined value, the at least one NB-IoT device [102] may be considered in the coverage of the cell, while in another scenario, if the at least one NB-IoT device [102] is in coverage of one cell, the at least one NB-IoT device [102] may camp on said cell. In another scenario, the at least one NB-IoT device [102] may start cell re-selection based on the measured channel quality and the type, wherein the at least one NB-IoT device [102] may further compare said channel quality with a new re-selection pre-defined value which may be different for the intra-frequency and the inter-frequency case. In an embodiment, the at least one NB-IoT device [102], to fulfil the S-criteria, may prioritise the cells and rank each cell based on the excess channel quality over another pre-defined value. In such event of prioritisation, a hysteresis may be added to avoid multiple cell reselection and to apply a cell specific offset for the intra frequency case; however, in case of LTE channels, no priorities may be defined for the different frequencies. The at least one NB-IoT device [102] may then select the highest ranked cell. In another embodiment of enabling a 400 KHz operation, the at least one NB-IoT device [102] may transmit the reports the cell rank as decided after measuring the S-Criteria. The NB-IOT device may use the ranks as well as the S-Criteria in a measurement report message to the at least one base station [104] in an uplink Control channel (NPUSCH message), based on which the at least one base station [104] may decide which channels can be aggregated for the given at least one NB-IoT device [102].

Figure 5:
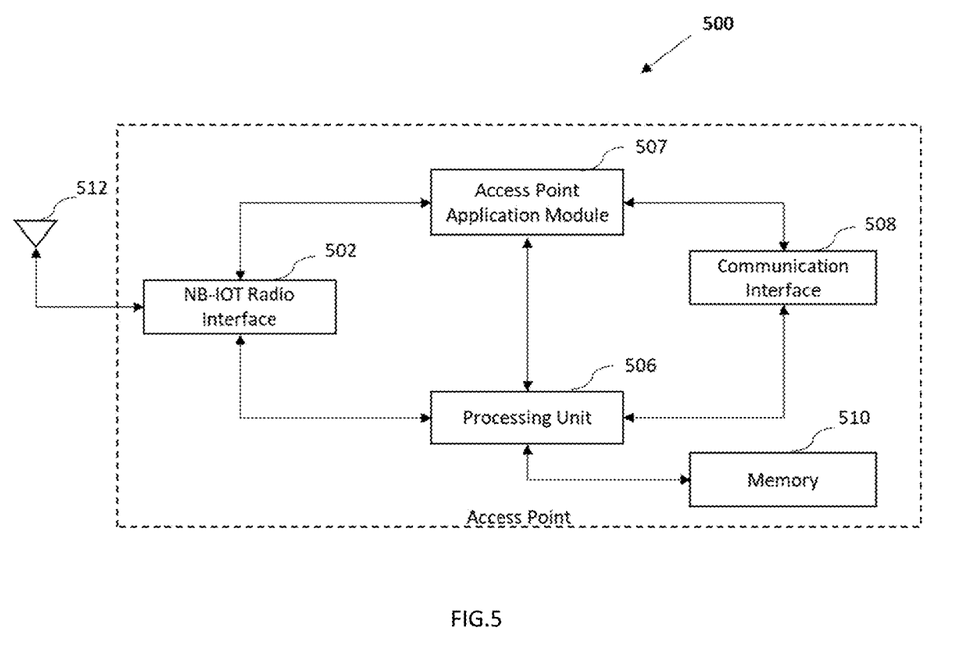
FIG. 5 illustrates an exemplary access point [500] for tuning to at least one available channel in a narrow band wireless network in accordance with an embodiment of the present disclosure.

FIG. 5 illustrates an exemplary access point [500] for tuning to at least one available channel in the narrow band wireless network in accordance with an embodiment of the present disclosure. The access point [400] comprises an NB-IOT radio interface [502], an access point application module [504], a processing unit [506], a communication interface [508], a memory [510] and an antenna [512].

The NB-IOT radio interface [502] may be configured to operate in conjunction with the antenna [512] of the access point [500] to provide wireless access to the at least one NB-IOT [102], according to one or more 3GPP NB-IOT protocols. The access point application module [504] may be configured for managing and provisioning each of the NB-IOT wireless access point. The processing unit [506] may be configured to execute functions/operations performed by each module/component of the access point [500]. The processing unit [506] as used herein may include, but not limited to, a processor or set of processors such as a microprocessor, a multi-core microprocessor, a digital signal processor, a collection of electronic circuits, or a combination thereof and may be configured to perform operations/functions as described herein. The memory [510], coupled to the processing unit [506], may allow the processing unit [506] to perform operations such as read, write, modify, delete and/or modify data in the memory [510]. The memory [510] may include, but not limited to, a volatile memory, non-volatile memory, a remote storage, a cloud storage, high-speed random-access memory and/or non-volatile memory, such as one or more magnetic disk storage devices, one or more optical storage devices, and/or flash memory (e.g., NAND, NOR) or a combination thereof. The communication interface [508] may be configured for backhaul and further reach out to an onboarding server for information exchange.

Thus, the system [100] may involve multiple components such as the at least one NB-IoT device [102], the MME [106], the Inter Channel Coordination Entity [108], the at least one base station [104] and associated components including, but not limiting to, the communication module [104A], the processing module [104B], the storage module [104C], and cellular stack [104E] and the cellular radio [104D] connected to the antenna [108]. Said components may be interlinked to each other for performing a plurality of inter-related functions and accomplish the objective of tuning to at least one available channel in a narrow band wireless network.

Figure 6:
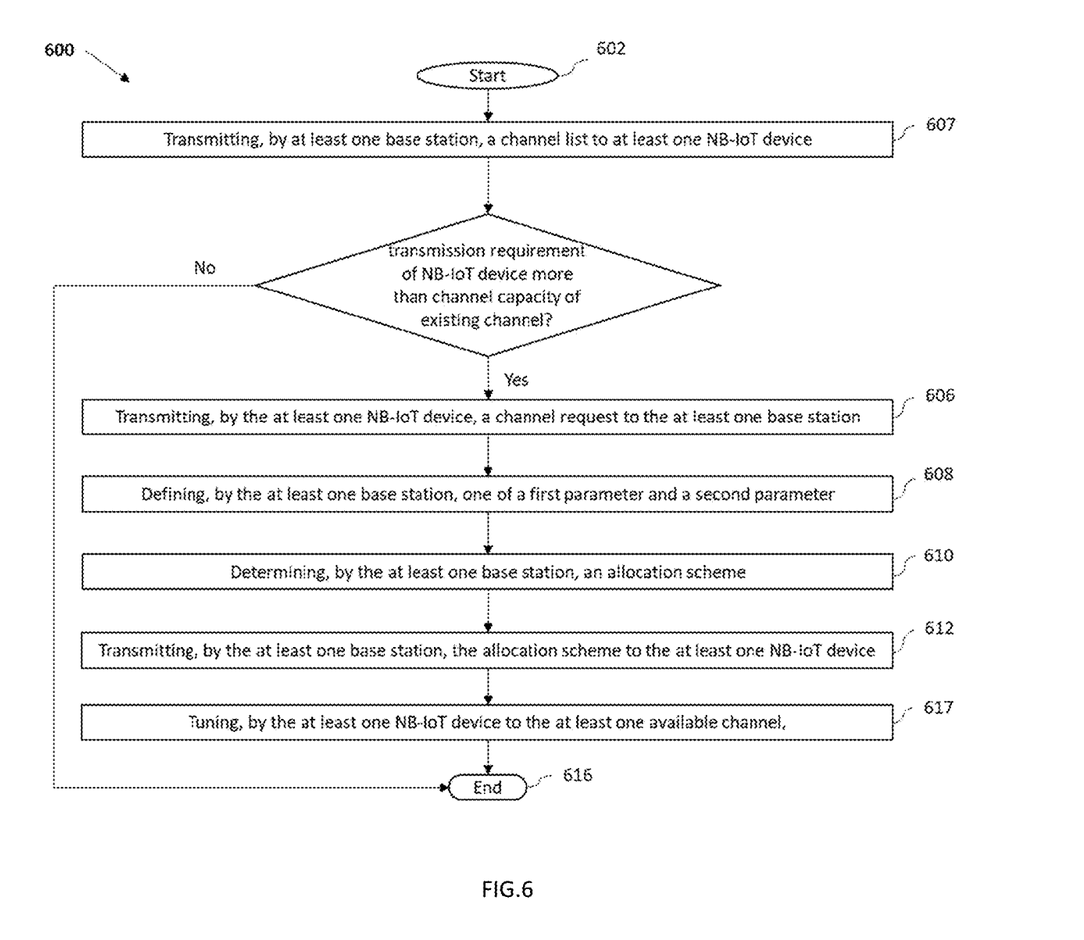
FIG. 6 illustrates an exemplary method [600] for tuning to at least one available channel in a narrow band wireless network in accordance with an embodiment of the present disclosure.

As illustrated in FIG. 6, the present disclosure encompasses an exemplary method [600] for tuning to the at least one available channel in the narrow band wireless network in accordance with an embodiment of the present disclosure. The method flow [600] may initiate at step 602 where the at least one NB-IoT device [102] may be latched to the at least one base station [104] via the at least one existing channel in the network.

At step 604, the communication module [104A] of the at least one base station [104], may be configured to transmit a channel list to the at least one NB-IoT device [102], wherein the channel list comprises the at least one available channel each having the unique channel identifier. In an embodiment, said channel list may be broadcasted to all the NB-IoT devices available in the coverage area of the at least one base station [104], while in another embodiment, said channel list may be transmitted to a particular NB-IoT device based on a pre-configured at least one communication parameter. On receiving the channel list, the at least one NB-IoT device [102] may read and analyze the channel list. In an event, the transmission requirement of the at least one NB-IoT device [102] is more than a channel capacity of the at least one existing channel, the method [600] may lead to step 606. Alternatively, the method [600] terminates at step 616.

At step 606, in an event the transmission requirement of the at least one NB-IoT device [102] is more than the channel capacity of the at least one existing channel, the at least one NB-IoT device [102] may transmit the channel request to the communication module [104A] through one of the RAC channel, the NPRACH channel, the NPUCH channel and the NAS level channel, wherein the channel request comprises the at least one communication parameter. The at least one communication parameter includes the operational mode of the at least one NB-IoT device [102], wherein said operational mode comprises one of an in-band operation, a guard band operation and a standalone operation. In addition, the at least one communication parameter comprises at least one of the bit indicator, the data status and the quality and the quantity of required number of channels from the channel list. Also, the channel request may be transmitted in one of a periodic manner, an on-demand manner and an on-the-fly manner.

At step 608, the processing module [104B] may be configured to define one of the first parameter and the second parameter based on the operational mode at least one NB-IoT device [102]. More particularly, the first parameter may be defined in an event the operational mode is found to be the in-band operation while the second parameter may be defined in an event the operational mode is found to be one of the guard band operation and the standalone operation.

At step 610, the processing module [104B] may be configured to determine the allocation scheme based on the at least one communication parameter, the unique channel identifier, and one of the first parameter and the second parameter, wherein the allocation scheme indicates the at least one available channel allocated to the at least one NB-IoT device [102], and mechanism for communicating/ transmission of data using the newly allotted channel i.e. either a newly added channel along with already existing channel or a new channel with larger channel width (e.g. 400 KHz).

At step 612, the processing unit [104B] may internally communicate the allocation scheme to the communication module [104A] that may be configured to transmit the allocation scheme to the at least one NB-IoT device [102] for enabling said tuning. In an embodiment, the allocation scheme may be transmitted to the at least one NB-IoT device [102] via NPDCCH channel.

At step 614, the at least one NB-IoT device [102] may be configured to decode the allocation scheme and subsequently tune to the at least one available channel. More particularly, said tuning may either correspond to aggregating the at least one existing channel with the at least one available channel having a 200 KHz channel width or may correspond to switching from the at least one existing channel to the at least one available channel having a 400 KHz channel width. The method terminates at step 616.

Figure 7:
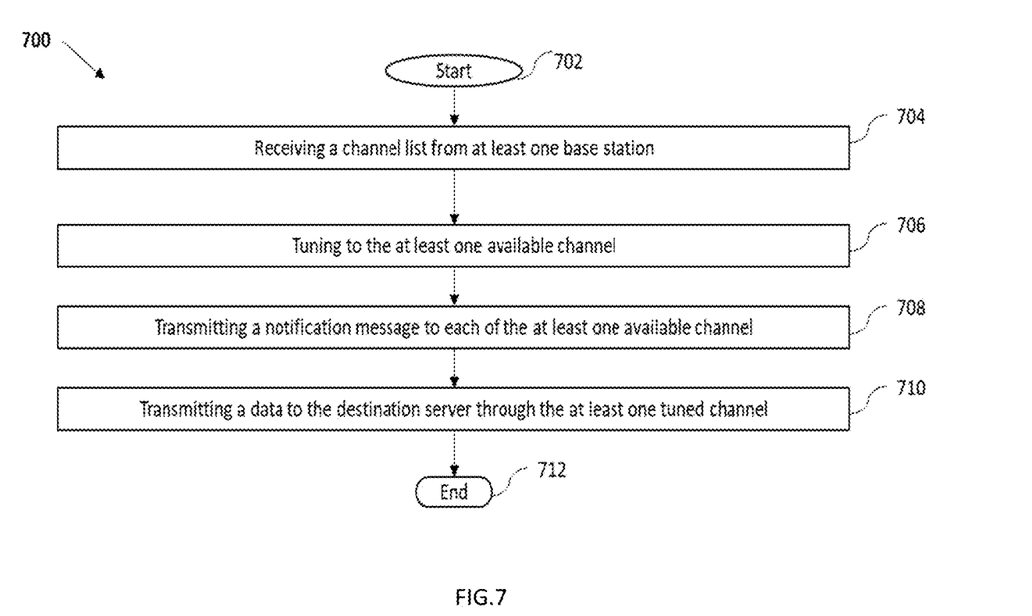
FIG. 7 illustrates an exemplary method [700] for tuning to at least one available channel in a narrow band wireless network in accordance with an embodiment of the present disclosure, wherein the method may be performed by the at least one NB-IoT device [102].

FIG. 7 illustrates an exemplary method [700] for tuning to the at least one available channel in the narrow band wireless network in accordance with an embodiment of the present disclosure, wherein the method [700] may be performed by the at least one the NB-IoT device [102]. The method [700] may initiate at step 702 where the at least one NB-IoT device [102] may be latched to the at least one base station [104] via the at least one existing channel in the network.

At step 704, the IOT application module [404], of the at least one NB-IoT device [102], may receive the channel list from the at least one base station [104], wherein the channel list comprises the at least one available channel and each of the at least one available channel has a unique channel identifier. Further, the IOT application module [404] may forward the channel list to the IOT application module [404].

At step 706, the processing unit [410] may tune to the at least one available channel based on the unique channel identifier and the at least one communication parameter of the at least one NB-IoT device [102]. The information relating to said tuning may be communicated to the on-boarding client module [406] of the at least one NB-IoT device [102].

At step 708, the on-boarding client module [406] may transmit a notification message to each of the at least one available channel based on said tuning, wherein the notification message includes information for directing to a destination server.

At step 710, the at least one NB-IoT device [102] may be configured to transmit a data to the destination server through the at least one tuned channel. The method [700] ends at step 712.

Figure 8:
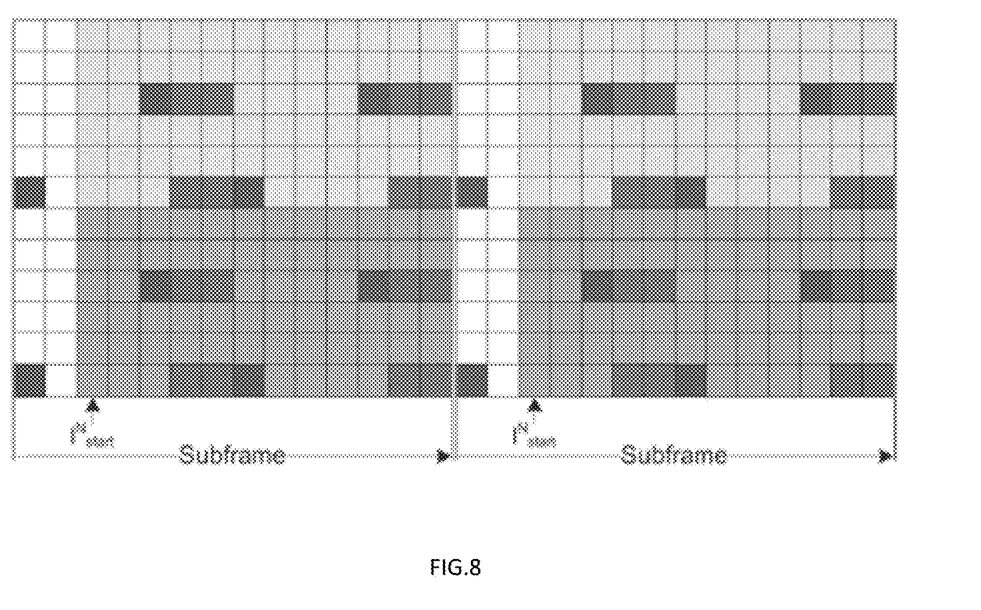
FIG. 8 illustrates mapping of a CRS of the LTE system to the NRS of the Narrow Band system, covering the 400 KHz NB-IoT cell.

As illustrated in FIG. 8, in an embodiment a mechanism may be disclosed to map the CRS of the LTE system to the NRS of the Narrow Band system, covering the 400 Khz NB-IOT cell, a sub frame of the NPDCCH channel (for an in-band operation and assuming a single antenna port in LTE cell and 2 antenna ports in the NB-IoT), may be mapped onto a Sub Frame (SF) of LTE CRS (Cell Specific Reference Signal) channel and NRS (Narrowband Reference Signal) channel. In an exemplary embodiment, the resource elements of said channels may be different for simplified mapping, for example, resource elements used by NPDCCH may be green in color, violet for LTE CRS and blue for NRS. For smooth mapping of the green colored resource elements (NPDCCH) around the NRS (blue) and the LTE CRS (violet), conflict with the LTE control channel may be avoided by defining the parameter $I^N_{start}$ and a control region size signaled by Narrow Band System Information Block 1 (NB-SIB) for the in-band operation to indicate the OFDM start symbol while setting said parameter to default (zero value) for the guard-band and standalone operation modes, thereby providing more resource elements for the NPDCCH. Further, for each SF, two narrowband control channel elements (NCCEs) may be defined in any color (for example green color) i.e. NCCE0 and NCCE1, wherein two NPDCCH channels having following format may be defined to use the NCCE0 and NCCE1:
1. NPDCCH format 0 using one NCCE element, wherein both of the NCCE0 and NCCE1 may be transmitted within a single SF; and
2. NPDCCH format 1 using both NCCE0 and NCCE1.

Moreover, for a 400 KHz NB-IOT channel, the PDCCH location may be predefined and published in the NB-SIB1 in an embodiment, while in another embodiment the PDCCH locations in a resource grid may be provided only in the first or the second 200 KHz resource elements only, wherein the PDCCH itself indicates the PUSCH location (in any of the 400 KHz channel) for uplink data transmission for a NB-IOT device.

Thus, the present disclosure comprises a mechanism for tuning to at least one available channel in a narrow band wireless network in an event the NB-IoT device [102] is required to transmit more data as compared to the channel capacity of an existing channel between the NB-IoT device and the other device or between the NB-IoT device [102] and the network. In one of the embodiments, the base station [104] coordinates with the NB-IoT device [102] for allocating the available channels to the NB-IoT device [102] and enabling the NB-IoT device [102] to tune to the available channels, while in another embodiment, the NB-IoT device [102] itself tunes to available channels. In addition, said aggregation of the available channels with the existing channels results in more efficient upload of the data with higher data rate from the NB-IoT device [102].

Though a limited number of the at least one NB-IoT device [102], the network entity [110], the at least one base station [104] and the components/sub systems therein, have been shown in the figures; however, it will be appreciated by those skilled in the art that the system [100] of the present disclosure encompasses any number and varied types of said entities/elements i.e. the at least one NB-IoT device [102], the network entity [110], the at least one base station [104] and the components/sub systems therein.

While considerable emphasis has been placed herein on the disclosed embodiments, it will be appreciated that many embodiments can be made and that many changes can be made to the embodiments without departing from the principles of the present disclosure. These and other changes in the embodiments of the present disclosure will be apparent to those skilled in the art, whereby it is to be understood that the foregoing descriptive matter to be implemented is illustrative and non-limiting.

What is claimed is:
1. A method for tuning to at least one available channel in a narrow band wireless network, the method comprising:
   transmitting, by at least one base station [104], a channel list to at least one a narrowband internet of things (NB-IoT) device [102], wherein
      the channel list comprises the at least one available channel,
      each of the at least one available channel has a unique channel identifier, and
      the at least one NB-IoT device [102] is latched to the at least one base station [104] via at least one existing channel;
   transmitting, by the at least one (NB-IoT) device [102], a channel request to the at least one base station [104], wherein
      the channel request comprises at least one communication parameter including an operational mode of the NB-IoT device [102], and
      the operational mode comprises one of an in-band operation, a guard band operation and a standalone operation;
   defining, by the at least one base station [104], a first parameter in event the operational mode is the in-band operation, and a second parameter in an event the operational mode is one of the guard band operation and the standalone operation, wherein
      the first parameter comprises an OFDM start symbol and a first control size, and
      the second parameter comprises a second control size;
   determining, by the at least one base station [104], an allocation scheme based on the at least one communication parameter, the unique channel identifier, and one of the first parameter and the second parameter, wherein the allocation scheme indicates the at least one available channel allocated to the at least one NB-IoT device [102];
   transmitting, by the at least one base station [104], the allocation scheme to the at least one NB-IoT device [102]; and
   tuning, by the at least one NB-IoT device [102], to the at least one available channel, wherein said tuning is performed pursuant to decoding of the allocation scheme.

2. The method as claimed in claim 1, further comprising communicating, by the at least one base station [104], a data flow between the at least one available channel.

3. The method as claimed in claim 1, wherein the at least one available channel and the at least one existing channel is a NB-IoT channel.

4. The method as claimed in claim 1, wherein, wherein the channel list is transmitted though one of a broadcast channel and a unicast channel.

5. The method as claimed in claim 1, wherein the channel request is received in an event a transmission requirement of the at least one NB-IoT device [102] is more than a channel capacity of the at least one existing channel.

6. The method as claimed in claim 1, wherein the channel request is received through one of a RAC channel, a NPRACH channel and a NAS level channel.

7. The method as claimed in claim 1, wherein the channel request is received from the at least one NB-IoT device [102] in one of a periodic manner, an on-demand manner and an on-the-fly manner.

8. The method as claimed in claim 1, wherein the at least one communication parameter comprises at least one of a bit indicator, a data status and a quality and a quantity of required channels from the channel list.

9. The method as claimed in claim 1, wherein the first control size is signalled by a broadcast message.

10. The method as claimed in claim 1, wherein the tuning corresponds to aggregating, by the at least one NB-IoT device [102], the at least one existing channel with the at least one available channel having a 200 KHz channel width.

11. The method as claimed in claim 1, wherein the tuning corresponds to switching, by the at least one NB-IoT device

[102], from the at least one existing channel to the at least one available channel having a 400 KHz channel width.

12. The method as claimed in claim 1, wherein the tuning comprising transmitting, by the at least one at least one NB-IoT device [102], a connection request to the at least one available channel.

13. A system for tuning to at least one available channel in a narrow band wireless network, the system comprising:
at least one base station [104] configured to transmit a channel list to at least one a narrowband internet of things (NB-IoT) device [102], wherein
the channel list comprises the at least one available channel,
each of the at least one available channel has a unique channel identifier, and
the at least one NB-IoT device [102] is latched to the at least one base station via at least one existing channel;
the at least one (NB-IoT) device [102] configured to transmit a channel request to the at least one base station [104], wherein
the channel request comprises at least one communication parameter including an operational mode of the NB-IoT device [102], and
the operational mode comprises one of an in-band operation, a guard band operation and a standalone operation;
the at least one base station [104] is further configured to:
define a first parameter in event the operational mode is the in-band operation, and a second parameter in an event the operational mode is one of the guard band operation and the standalone operation, wherein
the first parameter comprises an OFDM start symbol and a first control size, and
the second parameter comprises a second control size;
determine an allocation scheme based on the at least one communication parameter, the unique channel identifier, and one of the first parameter and the second parameter, wherein
the allocation scheme indicates the at least one available channel allocated to the at least one NB-IoT device [102];
transmit the allocation scheme to the at least one NB-IoT device [102]; and
the at least one NB-IoT device [102] is further configured to tune to the at least one available channel, wherein said tuning is performed pursuant to decoding of the allocation scheme.

14. The system as claimed in claim 13, wherein the at least one base station [104] is further configured to communicate a data flow between the at least one available channel.

15. A method for tuning to at least one available channel in a narrow band wireless network, the method being performed by at least one NB-IoT device [102], the method comprising:
receiving a channel list from at least one base station [104], wherein
the channel list comprises the at least one available channel,
each of the at least one available channel has a unique channel identifier, and
the at least one NB-IoT device [102] is latched to at least one base station via at least one existing channel;
tuning to the at least one available channel based on the unique channel identifier and at least one communication parameter of the at least one NB-IoT device [102]; and
transmitting a notification message to each of the at least one available channel based on said tuning, wherein the notification message includes information for directing to a destination server.

16. The method as claimed in claim 15, further comprising transmitting a data to the destination server through the at least one tuned channel.

17. The method as claimed in claim 15, further comprising:
measuring a channel quality and type of the at least one available channel,
comparing the measured channel quality and the type with a pre-defined channel value, and
tuning to the at least one available channel based on said comparison.

18. The method as claimed in claim 15, wherein the at least one available channel and the at least one existing channel is a NB-10T channel.

19. The method as claimed in claim 15, wherein, wherein the channel list is received though one of a broadcast channel and a unicast channel.

20. The method as claimed in claim 15, wherein the at least one communication parameter comprises at least one of a bit indicator, a data status and a quality and a quantity of required channels from the channel list, and a threshold parameter.

21. A NB-IoT device [102] for tuning to at least one available channel in a narrow band wireless network, the NB-IoT device [102] configured to:
receive a channel list from at least one base station [104], wherein
the channel list comprises the at least one available channel,
each of the at least one available channel has a unique channel identifier, and
the at least one NB-IoT device [102] is latched to at least one base station via at least one existing channel;
tune to the at least one available channel based on the unique channel identifier and at least one communication parameter of the at least one NB-IoT device [102]; and
transmit a notification message to each of the at least one available channel based on said tuning, wherein the notification message includes information for directing to a destination server.

22. The NB-IoT device as claimed in claim 21, further configured to transmit a data to the destination server through the at least one tuned channel.

23. The NB-IoT device as claimed in claim 21, further configured to:
measure a channel quality and type of the at least one available channel,
compare the measured channel quality and the type with a pre-defined channel value, and
tune to the at least one available channel based on said comparison.

* * * * *